Feb. 20, 1951   S. CROMER ET AL   2,542,905
APPARATUS FOR MEASURING PRESSURE

Filed Oct. 11, 1945   2 Sheets-Sheet 1

INVENTOR
EUGENE T. BOOTH JR.
SYLVAN CROMER
FRED L. ALEXANDER
BY
ATTORNEY

INVENTOR
EUGENE T. BOOTH JR.
SYLVAN CROMER
FRED L. ALEXANDER
BY
ATTORNEY

Patented Feb. 20, 1951

2,542,905

UNITED STATES PATENT OFFICE 2,542,905

APPARATUS FOR MEASURING PRESSURE

Sylvan Cromer, Oak Ridge, Tenn., and Eugene T. Booth, Jr., and Fred L. Alexander, New York, N. Y., assignors to the United States of America as represented by the United States Atomic Energy Commission Application October 11, 1945, Serial No. 621,865

4 Claims. (Cl. 73—406)

This invention relates to the measurement of pressure and more particularly to an improved apparatus for measuring the pressure of a corrosive fluid with a high degree of accuracy.

The measurement of the pressure of a corrosive fluid presents certain problems which are not encountered in measuring the pressures of non-corrosive fluids. Although numerous primary pressure measuring devices are known in the art, the number of these primary devices that may be used with corrosive fluids is limited by the fact that many of these devices operate in such manner that the chemical attack of the corrosive fluid tends to damage the device or render it inaccurate. Of the various known devices for measuring pressure, manometric measuring devices are in general the most accurate in cases where moderate pressures are to be measured. However such manometric devices cannot usually be employed directly in the case of corrosive fluids since the corrosive fluid is likely to react with the measuring fluid of the manometer. It is thus necessary to provide some means of preventing contact between the corrosive fluid and the measuring fluid of the manometer. So far as is known all of the prior methods for preventing contact between the corrosive fluid and the manometer fluid result in a decrease in accuracy and/or sensitivity of the measuring device.

It is accordingly an object of the present invention to provide an improved device for manometrically measuring the pressure of a corrosive fluid such as, for example, a fluid containing fluorine or a fluorine-containing compound.

It is another object of the invention to provide a pressure measuring device for measuring the pressure of a corrosive gas with an unusually high degree of accuracy.

It is still another object of the invention to provide a pressure measuring device capable of indicating the pressure of a fluid independent of barometric pressure.

Other objects of the invention will be in part obvious and in part pointed out hereinafter.

The principle of operation of the present invention comprises in general measuring the pressure of a corrosive fluid by establishing an inert fluid pressure that counteracts the corrosive fluid pressure, maintaining the inert fluid pressure at a value sufficient to balance the corrosive fluid pressure and measuring the inert fluid pressure as a measure of the corrosive fluid pressure. Apparatus in two alternative embodiments of the present invention is shown in the accompanying drawings. The many objects and advantages of the present apparatus may be best appreciated and understood by reference to the drawings wherein Fig. 1 is an axial cross-sectional view of a differential pressure responsive device;

Figure 1:
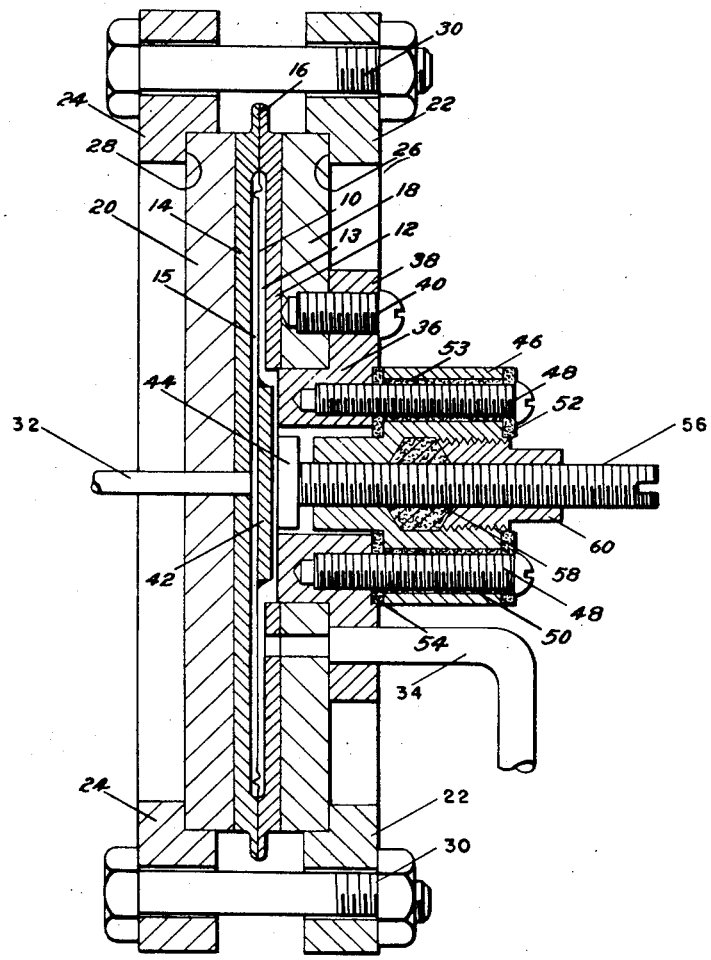

Referring to the drawings and particularly to Fig. 1 the numeral 10 designates a relatively thin flexible diaphragm constructed of a corrosion resistant material such as, for example nickel, and sealed between two slightly cupped discs 12 and 14 in such manner that the discs 12 and 14 cooperate to define an enclosed space which is divided into two chambers 13 and 15 by the diaphragm 10. The discs 12 and 14 are also preferably made of nickel and they and the diaphragm 10 are sealed at their peripheries by an atomic hydrogen weld 16. The nickel discs 12 and 14 are fixed to a pair of supporting discs 18 and 20 in any suitable manner such as by soldering, the function of the supporting discs 18 and 20 being to strengthen and support the nickel discs 12 and 14. Further support for the structure thus far described is provided by a pair of peripheral rings 22 and 24 which are provided with the internal annular steps or shoulders 26 and 28 respectively that fit over the peripheral portion of the discs 18 and 20. The rings 22 and 24 are pressed together in any suitable manner such as by the bolts 30 to insure that the diaphragm 10 is held firmly between the nickel discs 12 and 14 and to assist and reinforce the atomic hydrogen weld 16 in maintaining a tight joint at the periphery of the discs 12 and 14.

The chamber 15 is connected by a conduit 32 with a corrosive fluid system (not shown) in which the pressure is to be measured. For example the present device has been used to measure the pressure in a system containing uranium hexafluoride vapor under a pressure of about two pounds per square inch absolute. Since the walls of chamber 15 are constructed entirely of a corrosion resistant material there will be little if any chemical attack on these parts by the fluoride vapor. The diaphragm 10 is sufficiently thin to be deflected by the pressure exerted by the fluid in chamber 15 and in accordance with the present invention an inert fluid is introduced into the chamber 13 to establish a pressure that is just sufficient to balance the pressure in the chamber 15. This balancing pressure is measured as a measure of the corrosive fluid pressure. Inert pressure fluid is introduced into the chamber 13 through the conduit 34 in a manner described in detail hereinafter.

The nickel disc 12 and supporting disc 18 have a central hole into which an annular flange 36 of an annular plate 38 extends. The plate 38 is fixed to the supporting disc 18 in any suitable manner such as by the screws 40. The diaphragm 10 is provided with a button 42 that acts as an electrical contact and cooperates with a second electrical contact 44 supported in a block 46 that is mounted on the plate 38 by means of the screws 48. The screws 48 pass through the holes 50 in the block 46, the diameter of the holes 50 being sufficiently greater in diameter than the screws 48 to prevent electrical contact between the screws and the block 46. The screws 48 are further electrically insulated from the block 46 by the outer insulating discs 52, the insulating sleeves 50, and inner insulating discs 54, the inner discs 54 being effectively interposed between the block 46 and the plate 38 to insulate the block from the plate. The contact 44 is made adjustable with respect to the contact 42 by being mounted on a threaded shaft or adjusting member 56 that passes through the center of block 46. In order to prevent escape of pressure fluid from chamber 13 around the adjusting member 56 a packing 58 is provided that is held in place by a bushing or packing nut 60 which is threaded into the block 46. The construction is such that the adjusting member 56 may be rotated to so position the contact 44 that an electrical circuit will be completed through the contact 44 and button 42 on diaphragm 10 when the diaphragm is deflected by an increase in pressure in chamber 15 relative to the pressure in chamber 13. Thus the device shown in Fig. 1 is adapted to cooperate with a source of electrical energy to establish an electrical signal when the pressure in chamber 15 exceeds the pressure in chamber 13 and this electrical signal may be used to regulate the flow of pressure fluid through conduit 34 into chamber 13 in such manner as to rebalance the pressures in chambers 13 and 15.

Figure 2:
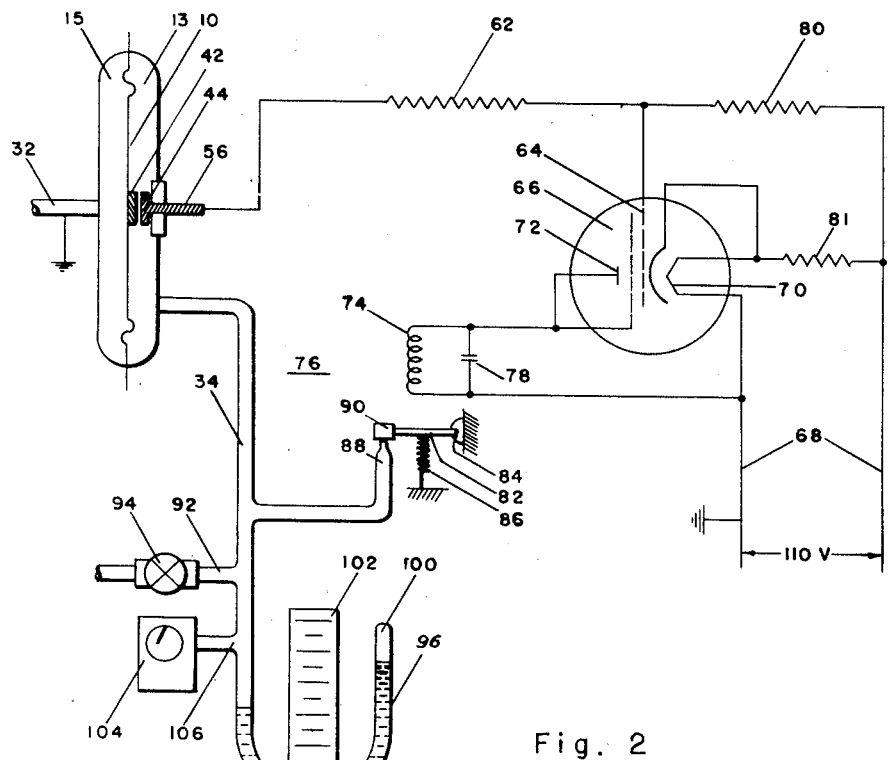
Fig. 2 is a diagrammatic view of apparatus incorporating the differential pressure responsive device of Fig. 1 in such manner as to measure the pressure of a corrosive fluid in the pressure range below atmospheric pressure.
Figure 3:
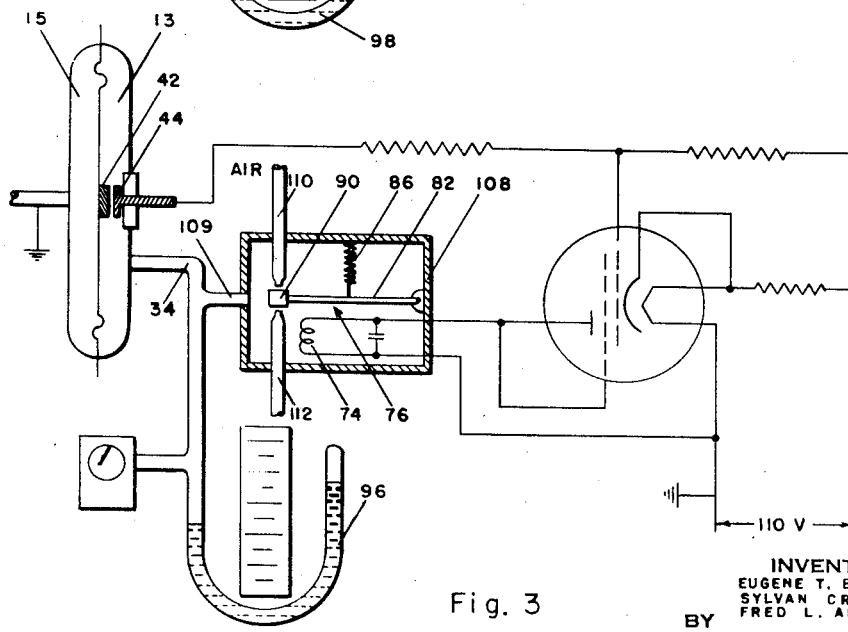
Fig. 3 is a diagrammatic view of apparatus similar to that of Fig. 2 but arranged to operate at a pressure either above or below atmospheric pressure.

The rebalancing of the pressures in chambers 13 and 15 may be effected in various ways and two ways of maintaining such a pressure balance are shown in Figs. 2 and 3. Referring first to Fig. 2 the adjusting member 56 and contact 44 are connected through a resistance 62 with the grid 64 of an electronic tube 66 of well-known construction. Electrical energy is supplied through the leads 68 from a suitable source of 110 volt alternating current to the filament 70 and plate 72 as well as to the grid 64 of the tube 66. The plate circuit includes a coil 74 of a relay generally designated as 76 and also includes a condenser 78. The grid circuit includes a resistance 80 in addition to the resistance 62. The filament circuit includes a resistance 81. The resistances 62, 80 and 81 may, for example, have values of one megohm, 150,000 ohms and 250 ohms, respectively.

The relay 76 regulates the supply of pressure fluid to the chamber 13 of the differential pressure responsive device. In addition to coil 74 the relay 76 includes an armature 82 which is pivoted at 84 and normally urged by a spring 86 downwardly against a small nozzle 88. The armature 82 is provided with a valve member 90 which is adapted to bear against the end of nozzle 88. The armature 82 and valve member 90 comprise a flapper valve that cooperates with the nozzle 88 to regulate the flow of fluid, in this case air, entering the nozzle 88. Nozzle 88 is connected to the pipe 34 which leads to the chamber 13 and also to the vacuum pipe 92 which leads to a suitable vacuum pump (not shown). The pipe 92 is provided with a regulating valve 94 that may be manually adjusted to regulate the rate at which the chamber 13 and pipe 34 are evacuated. Also connected to the nozzle 88 and pipe 34 there is an absolute pressure manometer 96 containing a suitable measuring fluid such as the oil 98. The end 100 of the manometer 96 is sealed in well-known manner so that the difference in level of the oil 98 in the two arms of the manometer 96 indicates the absolute pressure within the pipe 34 and chamber 13. A suitable scale 102 is provided for reading this differential level. If desired a conventional recording pressure instrument 104 may be connected into the pressure system by a pipe 106. However if highly accurate results are desired the reading of the manometer 96 should be relied upon since the manometer is much more sensitive to small variations in pressure than is a conventional pressure recorder.

The operation of the apparatus shown in Fig. 2 is largely apparent from its description. The valve 94 in vacuum pipe 92 is initially adjusted in such manner that the pressure system including chamber 13, pipe 34, nozzle 88 and manometer 96 is continuously evacuated at a relatively slow rate. In the illustrative case here being described the chamber 15 communicates through pipe 32 with a system containing uranium hexafluoride vapor under a pressure of about 2 p. s. i. absolute and the apparatus of Fig. 2 operates to maintain the pressure in chamber 13 equal to the pressure in chamber 15. If, for example, the pressure in chamber 15 exceeds the pressure in chamber 13 the diaphragm 10 will be deflected to the right as shown in Fig. 2 to cause the button 42 to bear against contact 44 and an electrical circuit is completed through the button and contact. Current will flow through resistance 62 thus decreasing the negative bias of grid 64 and producing an increase in the plate current of the tube 66. The increased current in the plate circuit flows through the coil 74 of relay 76 and the relay is so adjusted that this increase in current is sufficient to actuate the relay to cause the armature 82 to be drawn upwardly against the tension of spring 86. The condenser 78 in the plate circuit performs its well-known function of smoothing out the irregularities in the pulsating direct current that flows in the plate circuit.

When armature 82 is moved upwardly toward coil 74 valve member 90 is withdrawn from the end of nozzle 88 and air flows inwardly through nozzle 88 and pipe 34 to the chamber 13 of the differential pressure responsive device. The relationship between the adjustment of valve 94 and the size of the opening of the nozzle 88 is such that during the period the valve member 90 is away from the nozzle 88 the pressure will build up in the chamber 13.

When the pressure in chamber 13 exceeds the pressure in chamber 15 the diaphragm 10 is deflected toward the left as shown in Fig. 2 and the circuit through button 42 and contact 44 is broken. The operations described above occur in a reverse sense and relay 76 is partially deenergized to permit spring 86 to draw armature 82 downwardly. Valve member 90 is drawn against the end of nozzle 88 and the pressure in the chamber 13 starts decreasing again due to continued withdrawal of air from the system through pipe 92.

The net result of the above operations is that the pressure in chamber 13 is maintained substantially equal to the pressure in chamber 15 within very close limits. The operation of the electronic tube 66 is, of course, very rapid and the inertia of the armature 82 and valve member 90 are very small. The clearance between the button 42 and contact 44 may be made of the order of .001 inch. Therefore the operations described above can occur very rapidly and thus there is no substantial deviation of the pressure in chamber 13 from the pressure existing in chamber 15. As pointed out above the resistance 62 is made relatively large, preferably of the order of one megohm, to reduce the current flow through the electrical contacts to a relatively low value and thereby prevent damage to the contacts because of sparking. The manometer 96 responds accurately and sensitively to the pressure in pipe 34 and chamber 13 and therefore the reading of the manometer may be taken as a measure of the corrosive gas pressure in chamber 15. A relatively rough record of the pressure may be obtained by using the pressure recorder 104.

An alternative apparatus adapted to measure pressures either above or below atmospheric pressure is shown in Fig. 3. The apparatus of Fig. 3 is generally similar to that of Fig. 2 and only the differences between the two systems need be described. In Fig. 3 the coil 74 and armature 82 of relay 76 are encased in a closed chamber 108 that communicates through a pipe 109 and pipe 34 with chamber 13. Inserted in the chamber 108 there are two opposed nozzles 110 and 112, the nozzle 110 being connected to a source of air under pressure and the nozzle 112 being connected to a vacuum pump (not shown). The valve member 90 of the armature 82 is adapted to be drawn against one or the other of the nozzles 110 and 112 by the spring 86 or relay coil 74 respectively.

The operation of the apparatus shown in Fig. 3 is as follows: When the pressure in chamber 15 exceeds that in chamber 13 the button 42 is forced against the contact 44 and the current flow through coil 74 of relay 76 increases as previously described. Valve member 90 is drawn downwardly to close off vacuum nozzle 112 and open air nozzle 110 to cause the pressure in chamber 108, pipe 34 and chamber 13 to increase. On the other hand when the pressure in chamber 13 exceeds the pressure in chamber 15 armature 82 is drawn upwardly by the spring 86 and valve member 90 closes air nozzle 110 and opens vacuum nozzle 112 to cause the pressure in chamber 13 to decrease. As in the case of the apparatus of Fig. 2 the pressure in chambers 13 and 15 will be maintained substantially equal and the inert gas pressure in chamber 13 may be measured by the manometer 96.

It has been found that the apparatus of the present invention permits the measurement of the pressure of a corrosive gas with exceptional accuracy. In some cases, for example, the pressures of corrosive gases have been measured with an accuracy of better than 0.1% even at pressures as low as 2 p. s. i. absolute. By utilizing the absolute pressure manometer 96 the measurement may be made wholly independent of barometric pressure and thus any errors that might arise from an independent measurement of barometric pressure and suitable correction for barometric pressure are eliminated. Although the present apparatus is particularly useful for measuring the pressures of corrosive fluids it may, of course, be used to measure the pressures of non-corrosive fluids as well. Either the measured fluid or the controlled fluid may be either a liquid or a gas.

It is evident that the present apparatus may be used to measure differential pressure as well as a single pressure. In measuring differential pressure two differential pressure responsive devices and their associated pneumato-electrical systems as shown in Figs. 2 and 3 are connected to opposite arms of a manometer such as the manometer 96. The manometer indicates the differential pressure. When used for measuring differential pressure the present apparatus is exceptionally accurate. In some cases differential pressure measurements have been made with an accuracy of better than 0.01%.

It is to be understood that the foregoing description is intended to be illustrative only and other applications of the present apparatus as well as modifications thereof within the scope of the invention will be apparent to those skilled in the art.

We claim:

1. In apparatus for measuring the pressure of a fluid, in combination, a flexible diaphragm having one side exposed to the pressure to be measured, said diaphragm being deflectable by said measured pressure, fluid pressure supply means for supplying a controlled fluid pressure to the other side of said diaphragm, means cooperating with said diaphragm for establishing an electrical signal when said diaphragm is deflected by said measured pressure, valve means for regulating the fluid pressure supplied by said fluid pressure supply means, said valve means comprising a nozzle and cooperating flapper valve, means responsive to said electrical signal for adjusting said flapper valve to maintain said controlled pressure substantially equal to said measured pressure, and means responsive to the magnitude of said controlled pressure for indicating the magnitude of said measured pressure.

2. In apparatus for measuring the pressure of a fluid, in combination, a flexible member having one side exposed to the pressure to be measured, said member being deflectable by said measured pressure, a source of fluid under pressure, a fluid pressure system for conducting pressure fluid from said source to the other side of said member, said system comprising regulating means for maintaining a relatively small regulated flow into said system, a nozzle permitting escape of fluid from said system and a flapper valve for controlling the escape of fluid from said system to control the pressure in said system, means cooperating with said member for establishing an electrical signal when said member is deflected by said measured pressure, means responsive to said electrical signal for adjusting said flapper valve to maintain the pressure in said system substantially equal to said measured pressure, and means responsive to the magnitude of said controlled pressure for indicating the magnitude of said measured pressure.

3. In apparatus for measuring the pressure of a fluid, in combination, a flexible member having one side exposed to the pressure to be measured, said member being deflectable by said measured pressure, a source of fluid under pressure, a fluid pressure system for conducting pressure fluid from said source to the other side of said member, said system comprising a first nozzle regulating admission of pressure fluid to said system, a second nozzle regulating escape of said fluid from said system and a flapper valve cooperable with said two nozzles to selectively close one of said nozzles and open the other of said nozzles to control the pressure in said system, means cooperating with said member for establishing an electrical signal when said member is deflected by said measured pressure, means responsive to said electrical signal for adjusting said flapper valve to maintain the pressure in said system substantially equal to said measured pressure, and means responsive to the magnitude of said controlled pressure for indicating the magnitude of said measured pressure.

4. Control apparatus for establishing in a fluid pressure system a fluid pressure substantially equal to a variable pressure comprising, in combination with said fluid pressure system, a source of fluid under pressure for supplying pressure fluid to said system, regulating means for regulating the flow of pressure fluid to said system, said regulating means comprising a nozzle permitting escape of said fluid from said system and a cooperating flapper valve, means responsive to said variable pressure and to said fluid pressure for creating an electrical signal when said variable pressure departs from said fluid pressure, amplifying means for amplifying said electrical signal, and means responsive to said amplified signal for adjusting said flapper valve to maintain said fluid pressure substantially equal to said variable pressure.

SYLVAN CROMER.
EUGENE T. BOOTH, Jr.
FRED L. ALEXANDER.

REFERENCES CITED

The following references are of record in the file of this patent:

UNITED STATES PATENTS

| Number | Name | Date |
|---|---|---|
| 1,631,909 | Badin | June 7, 1927 |
| 1,747,153 | Phelan | Feb. 11, 1930 |
| 1,938,492 | Moller | Dec. 5, 1933 |
| 1,957,106 | Kerzak | May 1, 1934 |
| 2,092,844 | Hoekstra | Sept. 14, 1937 |
| 2,223,712 | Ziebolz | Dec. 3, 1940 |
| 2,257,577 | Rosenberger | Sept. 30, 1941 |
| 2,265,114 | Hartley | Dec. 2, 1941 |
| 2,320,881 | Newton | June 1, 1943 |
| 2,362,874 | Wiley | Nov. 14, 1944 |
| 2,369,463 | Ibbott | Feb. 13, 1945 |
| 2,374,945 | Minter | May 1, 1945 |

FOREIGN PATENTS

| Number | Country | Date |
|---|---|---|
| 715,429 | France | Dec. 3, 1931 |